(12) United States Patent
Kang

(10) Patent No.: US 12,007,560 B2
(45) Date of Patent: Jun. 11, 2024

(54) HEAD-UP DISPLAY DEVICE HAVING LIGHT SOURCES ARRANGED IN ROWS SUPPLIED WITH DIFFERENT CURRENTS

(71) Applicant: HYUNDAI MOBIS CO., LTD., Seoul (KR)

(72) Inventor: Hyun Woo Kang, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/703,309

(22) Filed: Mar. 24, 2022

(65) Prior Publication Data

US 2022/0326518 A1     Oct. 13, 2022

(30) Foreign Application Priority Data

Apr. 8, 2021    (KR) ......................... 10-2021-0045732

(51) Int. Cl.
     *G09G 5/00*       (2006.01)
     *G02B 3/08*       (2006.01)
     *G02B 27/01*      (2006.01)

(52) U.S. Cl.
     CPC ........... *G02B 27/0101* (2013.01); *G02B 3/08* (2013.01); *G02B 2027/0181* (2013.01); *G02B 2027/0192* (2013.01)

(58) Field of Classification Search
     CPC ................. G02B 27/0101; G02B 3/08; G02B 2027/0181; G02B 2027/0192
     USPC .......................................................... 345/7
     See application file for complete search history.

(56) References Cited

U.S. PATENT DOCUMENTS

| | | | |
|---|---|---|---|
| 2002/0080495 A1* | 6/2002 | Anderson | G02B 27/0101 359/742 |
| 2014/0267031 A1* | 9/2014 | Huebner | G06F 3/0346 345/158 |
| 2017/0059859 A1* | 3/2017 | Haberl | G02B 27/0101 |
| 2017/0069612 A1* | 3/2017 | Zhang | G03B 21/2033 |
| 2018/0321488 A1* | 11/2018 | Usukura | G02B 27/0101 |
| 2019/0162960 A1* | 5/2019 | Harada | G02F 1/133603 |
| 2019/0219823 A1* | 7/2019 | Henon | G02B 27/0101 |
| 2019/0361298 A1* | 11/2019 | Mifune | G02B 27/0101 |
| 2019/0369396 A1* | 12/2019 | Smith | B60K 35/00 |
| 2020/0241297 A1* | 7/2020 | Hatasako | H02K 7/06 |

\* cited by examiner

*Primary Examiner* — Jonathan M Blancha
(74) *Attorney, Agent, or Firm* — NovoTechIP International PLLC

(57) ABSTRACT

According to at least one aspect, the present disclosure provides a head-up display device comprising: a housing; a plurality of light sources housed at the housing and configured to emit light; a display panel configured to display an image based on the light emitted from the plurality of light sources; and a Fresnel lens configured to magnify the image displayed at the display panel. According to another aspect, the present disclosure provides a head-up display device configured to project an image on a windshield of a vehicle, comprising: a housing; a plurality of light sources housed at the housing and configured to emit light; and a display panel configured to display an image based on the light emitted from the plurality of light sources, wherein the plurality of light sources are divided into a plurality of groups, each group being supplied with a current having a mutually different magnitude.

17 Claims, 6 Drawing Sheets

HEAD-UP DISPLAY DEVICE HAVING LIGHT SOURCES ARRANGED IN ROWS SUPPLIED WITH DIFFERENT CURRENTS

CROSS-REFERENCE TO RELATED APPLICATION

This application claims priority to and the benefit of Korean Patent Application No. 10-2021-0045732, filed on Apr. 8, 2021, the disclosure of which is incorporated herein by reference in its entirety.

TECHNICAL FIELD

The present disclosure relates to a head-up display device.

BACKGROUND

The content described in this section merely provides the background information on the present disclosure and does not constitute the prior art.

Recently, the automobile market is developing with a preference for an intelligent automobile equipped with advanced Information Technology (IT). In particular, products which support driving stability and driver's convenience are being released. Among them, a Head-Up Display (HUD) for a vehicle is receiving attention.

The head-up display device may provide various pieces of screen information to the driver by generating a virtual image in front of a driver, especially on a windshield and displaying information in the virtual image. The information provided to the driver may include dashboard information such as vehicle speed, a remaining fuel amount, or the Revolution Per Minute (RPM) of an engine and navigation information. Since the driver may easily grasp information displayed in front without moving his or her eyes while driving, driving stability may be enhanced. The HUD system may provide a driver with lane indications, construction indications, traffic-accident indications, and warning indications indicating pedestrians, which are helpful when a front view is not good, in addition to the dashboard information and the navigation information, in an Augmented Reality (AR) technique.

FIGS. 1(a) and 1(b) are diagrams showing a conventional head-up display device. FIG. 1(b) shows a conventional head-up display device configured to implement a screen larger than that of FIG. 1(a) on a windshield.

Generally, as shown in FIGS. 1(a) and 1(b), the conventional head-up display device is configured such that light emitted from a display panel passes through two reflection units, is irradiated onto the windshield 4, and then is directed to an eye-box 5. Recently, there is an increasing demand for a head-up display device that provides a large screen to a driver so as to increase the driver visibility.

In the case of the conventional head-up display device, in order to increase the size of the screen, the size of an aspherical mirror 3a disposed in FIG. 1(a) should be inevitably increased to the size of an aspherical mirror 3b disposed in FIG. 1(b). An increase in size of the aspherical mirror eventually leads to a drawback that the head-up display device should be replaced with the head-up display device 1b of FIG. 1(b), which is larger than the head-up display device 1a of FIG. 1(a).

As the size of the head-up display device increases, it is difficult to assemble the head-up display device in a limited space of the vehicle. Furthermore, an increase in the size of the head-up display device has a drawback that manufacturing costs increase.

SUMMARY

According to at least one aspect, the present disclosure provides a head-up display device comprising: a housing; a plurality of light sources housed at the housing and configured to emit light; a display panel configured to display an image based on the light emitted from the plurality of light sources; and a Fresnel lens configured to magnify the image displayed at the display panel.

According to another aspect, the present disclosure provides a head-up display device configured to project an image on a windshield of a vehicle, comprising: a housing; a plurality of light sources housed at the housing and configured to emit light; and a display panel configured to display an image based on the light emitted from the plurality of light sources, wherein the plurality of light sources are divided into a plurality of groups, each group being supplied with a current having a mutually different magnitude.

REFERENCE NUMERICALS

Figure 1A:
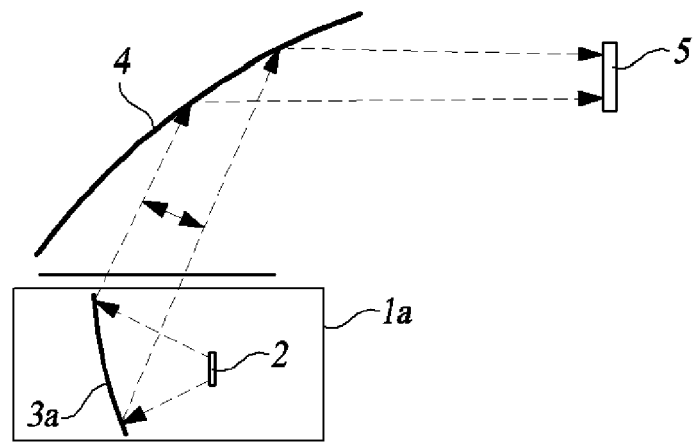
FIGS. 1(a) and 1(b) are a diagram showing a conventional head-up display device.

100: head-up display device
110: housing
120: drive unit
130: pivot device
140: optical system

DETAILED DESCRIPTION

In view of the above, the present disclosure is to miniaturize a head-up display device and simultaneously increase the size of a screen reflected by a windshield.

Furthermore, the present disclosure is to miniaturize a head-up display device, thus reducing manufacturing costs.

The problems to be solved by the present disclosure are not limited to the above-mentioned problems, and other problems which are not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like refer to one or more units for processing at least one function or operation, which may be implemented by hardware, software, or a combination thereof.

Figure 2:
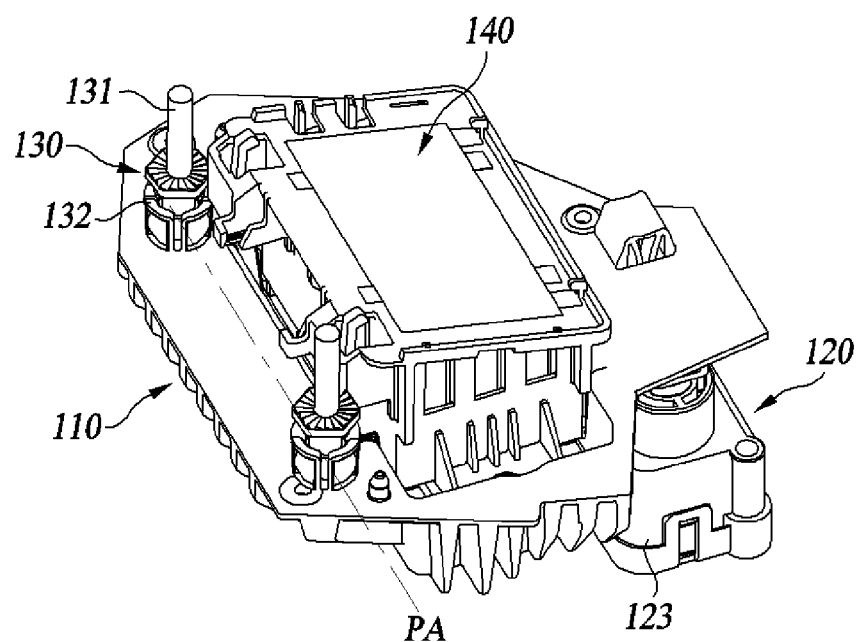
FIG. 2 is a perspective view showing a head-up display device according to an embodiment of the present disclosure.
Figure 3:
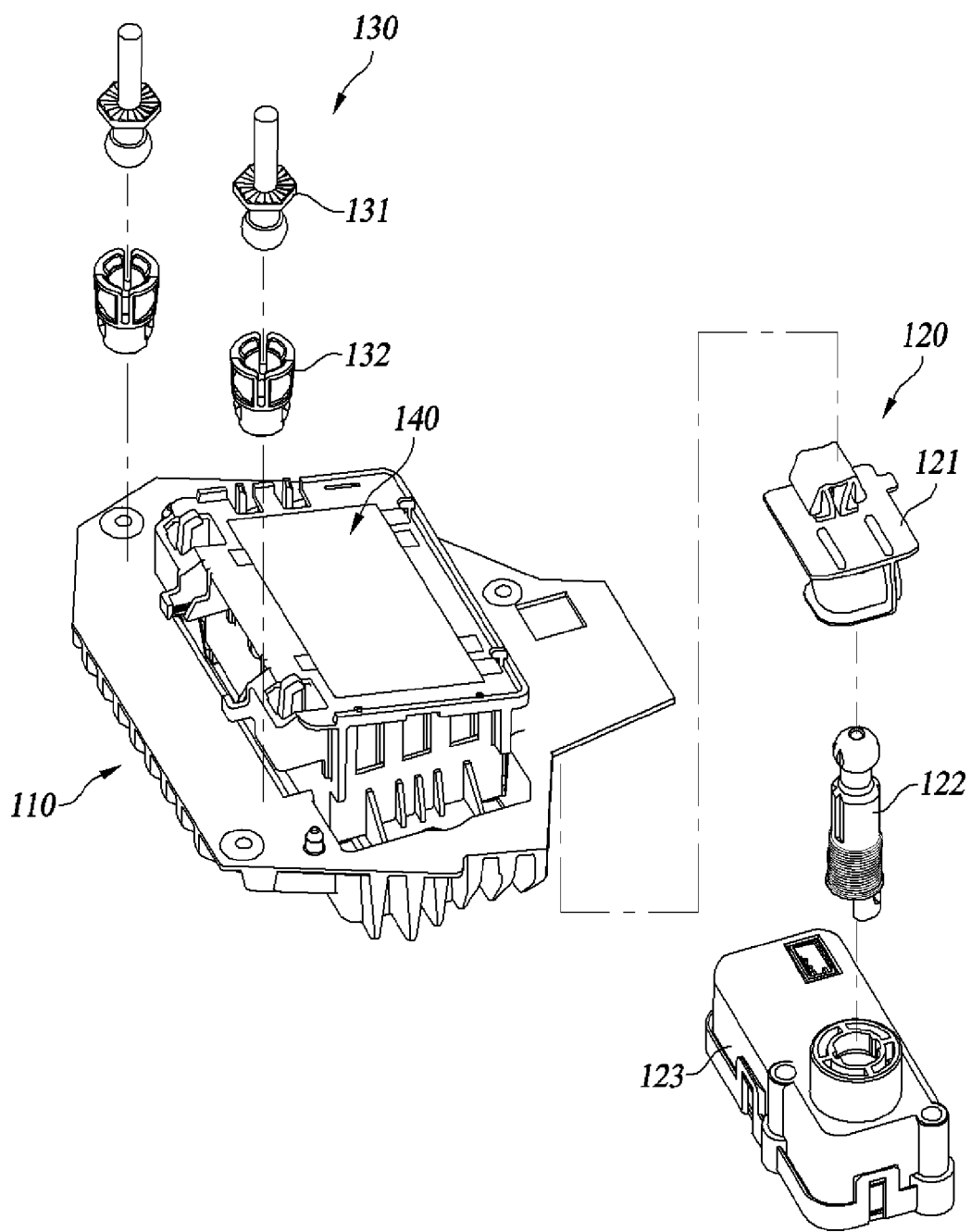
FIG. 3 is an exploded perspective view showing the head-up display device according to an embodiment of the present disclosure.

FIG. 2 is a perspective view showing a head-up display device according to an embodiment of the present disclosure. FIG. 3 is an exploded perspective view showing the head-up display device according to an embodiment of the present disclosure.

Referring to FIGS. 2 and 3, the head-up display device includes all or some of a housing 110, a drive unit 120, a pivot device 130, and an optical system 140.

A receiving space is defined in the housing 110. The housing 110 may be made of a plastic or metal material, and may protect components disposed in the housing 110 from external shocks. The housing 110 may be mounted in a vehicle.

The drive unit 120 is coupled to a side of the housing 110 and disposed to control the rotation of the housing 110. The housing 110 rotates about a pivot axis PA. The drive unit 120 includes a support unit 121, a driving connection unit 122, and a driving motor unit 123.

The support unit 121 is coupled to a side of the housing.

The driving connection unit 122 is coupled at one end thereof to the support unit 121, and is coupled at the other end thereof to the driving motor unit 123.

The driving motor unit 123 is configured to rectilinearly move the support unit 121. That is, the driving motor unit 123 converts the rotary movement of a motor installed therein into a rectilinear movement and then transmits the rectilinear movement to the support unit 121. Thus, as the support unit 121 moves rectilinearly, the housing 110 rotates about the pivot axis PA.

The pivot device 130 is coupled to a portion of the housing 110 so as to form the pivot axis PA about which the housing 110 is rotated. The pivot device 130 includes a pivot connecting unit 131 and a retainer 132.

The pivot connecting unit 131 is fixed at a first end thereof, and has the shape of a ball at a second end opposite to the first end. The first end of the pivot connecting unit 131 may be coupled and fixed to an inner wall of a vehicle side when the head-up display device 100 is mounted in the vehicle. The second end of the pivot connecting unit 131 has the shape of a ball so that the housing 110 may rotate about the pivot axis PA, when a side of the housing 110 is moved up and down by the drive unit 120.

The retainer 132 is configured such that the second end of the pivot connecting unit 131 is inserted and coupled, and is fixed to a portion of the housing 110. For instance, as shown in FIG. 2, the retainer 132 may be coupled to a side opposite to a portion to which the support unit 121 is coupled. However, the retainer 132 and the support unit 121 are not necessarily disposed to be opposite to each other, and may be disposed on a vertical surface of the housing 110.

The head-up display device 100 may include two pivot devices 130. The pivot axis PA is formed to penetrate both the second ends of the pivot connecting units 131 of the two pivot devices 130. The pivot axis PA may be formed in a direction perpendicular to the vertical moving direction of the support unit 121.

Figure 4:
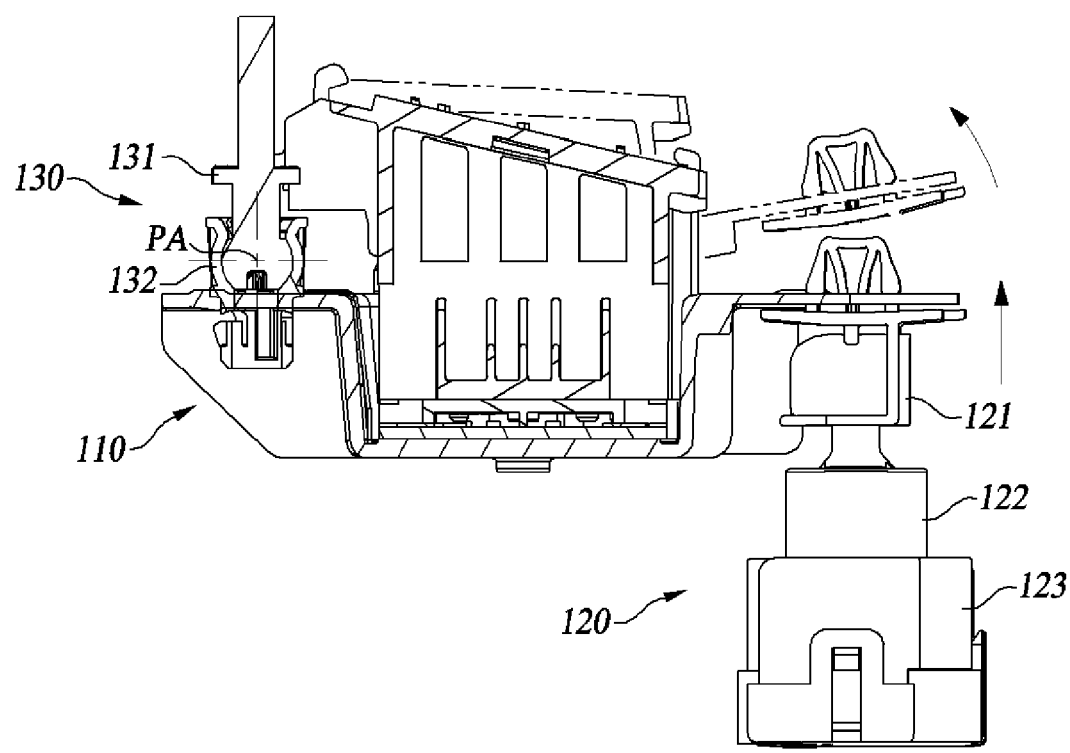
FIG. 4 is a side view illustrating the rotation of the head-up display device according to an embodiment of the present disclosure.

FIG. 4 is a side view illustrating the rotation of the head-up display device according to an embodiment of the present disclosure. In the following description, the term "clockwise" or "counterclockwise" is the term for describing the rotating direction of the housing 110, and this direction is determined on the basis of the side view of FIG. 4.

If the drive unit 120 rectilinearly pushes the housing 110 using the support unit 121, the housing 110 rotates about the pivot axis PA. In FIG. 4, the housing 110 rotates counterclockwise about the pivot axis PA.

Figure 5:
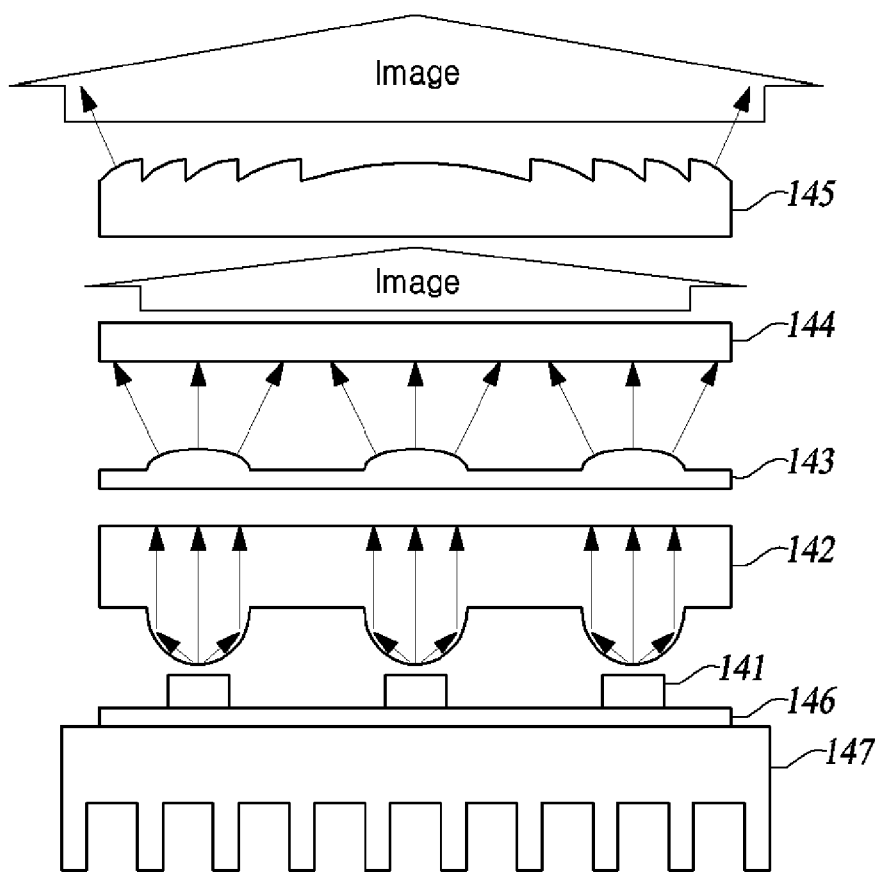
FIGS. 5 and 6 are schematic views illustrating the light path of the head-up display device according to an embodiment of the present disclosure.
Figure 6:
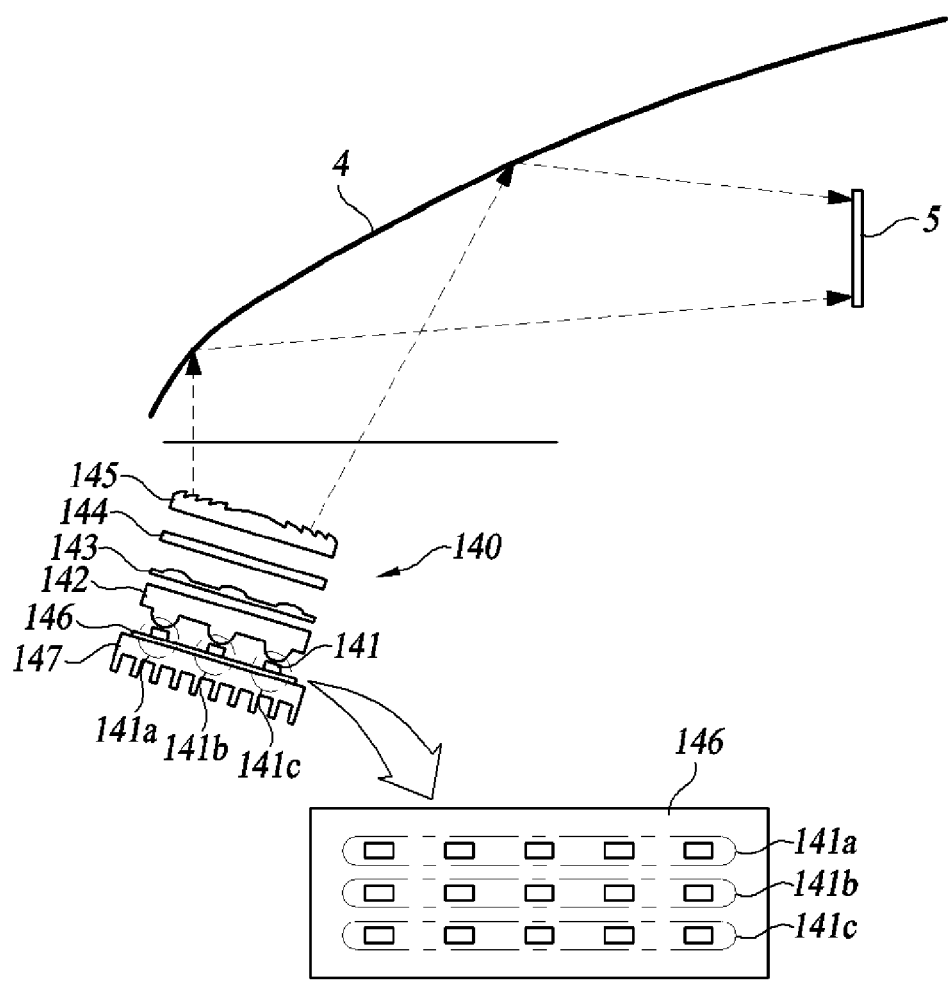

FIGS. 5 and 6 are schematic views illustrating the light path of the head-up display device according to an embodiment of the present disclosure.

Referring to FIG. 5, the optical system 140 includes all or some of a plurality of light sources 141, a first optical part 142, a second optical part 143, a display panel 144, and a Fresnel lens 145.

The plurality of light sources 141 are disposed in the housing 110 to emit light. The plurality of light sources 141 may be arranged in a certain grid arrangement, but is not limited thereto. The plurality of light sources 141 may be Light-Emitting Diodes (LEDs). The plurality of light sources 141 are disposed on a Printed Circuit Board (PCB) 146, and heat generated from the plurality of light sources 141 is radiated to the outside by a heat sink 147 which is disposed under the PCB 146.

The light emitted from the plurality of light sources 141 passes through the first optical part 142 and the second optical part 143 and then is projected on the display panel 144. The first optical part 142 may collect light from the plurality of light sources 141. Here, the first optical part 142 may have a silicon material. The first optical part 142 collects light dispersed from the plurality of light sources 141 and then causes the light to uniformly travel. Due to the characteristics of the first optical part 142, a conventional component, i.e., a diffuser which makes light uniformly may be omitted.

The light collected by the first optical part 142 passes through the second optical part 143, and the second optical part 143 is configured to emit the light and form an image on the display panel 144. For instance, when the light source 141 is an LED, the second optical part may refract the collected LED beam in the form of an LED chip and form an image on the display panel. Here, the second optical part 143 may be an aspherical lens.

The display panel 144 implements the form of an image which may provide specific information to a user using the light projected from the second optical part 143.

The image emitted from or displayed at the display panel 144 passes through the Fresnel lens 145. The image may be magnified while passing through the Fresnel lens 145. Here, the Fresnel lens 145 may be a concave or convex Fresnel lens. The conventional head-up display device shown in FIGS. 1(a) and 1(b) magnifies an image using an aspherical mirror to project a virtual image on the windshield, while the head-up display device 100 according to the present disclosure magnifies an image using the Fresnel lens 145 instead of the aspherical mirror to project the virtual image on the windshield.

In the case of using the aspherical mirror, as the size of a virtual-image screen projected on the windshield increases, the size of the aspherical mirror is inevitably increased. However, according to the present disclosure, the size of the head-up display device may be reduced and simultaneously a large screen may be realized on the windshield using the Fresnel lens 145 instead of the aspherical mirror.

Figure 1B:
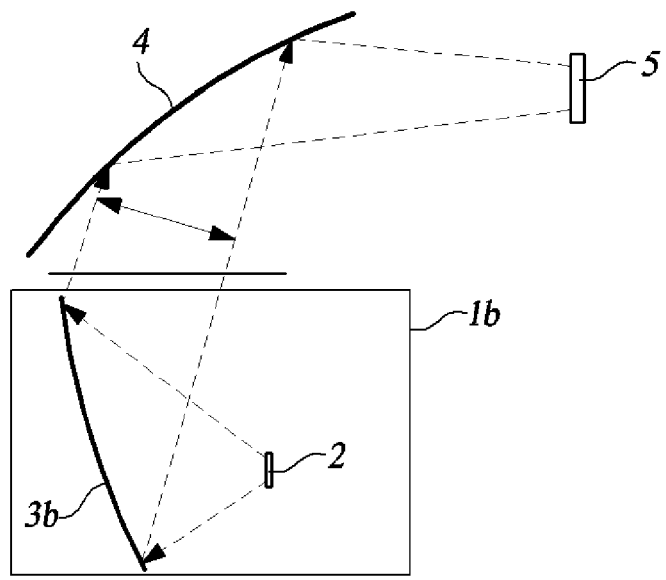

The display panel 144 is disposed over the plurality of light sources 141, and the Fresnel lens 145 is disposed over the display panel 144. The plurality of light sources 141, the display panel 144, and the Fresnel lens 145 may be sequentially stacked to horizontally overlap each other and arranged in a row in a direction in which light travels. Such an arrangement can improve the efficiency of space arrangement. Referring to FIGS. 1(a) and 1(b) showing the prior art, the aspherical mirror occupies an excessively large space in the head-up display device. However, the present disclosure provides a compact configuration without the waste of space.

Referring to FIG. 6, the head-up display device 100 may vary the amount of light emitted by each of the plurality of light sources 141. The plurality of light sources 141 may be divided into a plurality of groups or regions, and the amount of current supplied to each region may be different. In other words, the plurality of light sources 141 may be divided into N (N is a natural number equal to or greater than 2) groups or regions to make first to N-th groups or regions, and the amount of current supplied to each group or region may be different.

For instance, according to an embodiment shown in FIG. 6, the plurality of light sources 141 are divided into first to third groups or regions 141a to 141c. The image emitted from or displayed at the display panel 144 is irradiated to the windshield 4. At this time, light uniformity may be deteriorated due to the shape of the windshield 4. In order to compensate for the deteriorated light uniformity, the head-up display device 100 may vary the amount of current supplied to the first to third groups or regions 141a to 141c.

The amount of current supplied to the first group or region 141a irradiating light in a direction which is closest to the windshield 4 may be minimized, and the amount of current supplied to the third group or region 141c irradiating light in a direction which is farthest from the windshield 4 may be maximized. In other words, a larger amount of current may be supplied in a group or region irradiating light in a direction away from the windshield 4. For instance, the current of 180 mA may be supplied to the first group or region, the current of 250 mA may be supplied to the second region, and the current of 350 mA may be supplied to the third group or region.

As described above, an embodiment is advantageous in that a head-up display device is miniaturized using a Fresnel lens instead of an aspherical mirror, and the size of a screen reflected by a windshield is increased.

Further, an embodiment is advantageous in that a head-up display device is miniaturized, thus making it simple to perform an assembling operation in a vehicle.

Furthermore, an embodiment is advantageous in that a head-up display device is miniaturized, thus reducing production costs.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A head-up display device comprising:
   a housing;
   a plurality of light sources housed at the housing and arranged in a plurality of rows having first and second rows, each light source configured to emit light;
   a display panel configured to display an image based on the light emitted from the plurality of light sources;
   a Fresnel lens configured to magnify the image displayed at the display panel and project the magnified image on a windshield of a vehicle; and
   an optical part disposed between the plurality of light sources and the display panel, the optical part comprising:
      a first optical part configured to collect the light emitted from the light sources, the first optical part including a plurality of first optical structures respectively disposed corresponding to the plurality of light sources and protruding in a first direction toward the plurality of light sources; and
      a second optical part configured to emit the light collected by the first optical part towards the display panel, the second optical part including a plurality of second optical structures respectively disposed corresponding to the plurality of first optical structures and spaced apart from each other, each second optical structure having a convex shape protruding in a second direction toward the display panel,
   wherein each row of the light sources is at a mutually different distance from the windshield and is supplied with a mutually different current set to compensate a deterioration in light uniformity of the magnified image projected on the windshield due to the mutually different distance between each row and the windshield, and
   wherein the plurality of light sources comprises:
      a first light source arranged on the first row, being at a first distance to the windshield, and supplied with a first current; and
      a second light source arranged on the second row, being at a second distance to the windshield greater than the first distance, and supplied with a second current greater than the first current.

2. The head-up display device of claim 1, wherein:
   the display panel is disposed over the plurality of light sources,
   the Fresnel lens is disposed over the display panel, and
   the plurality of light sources, the display panel, and the Fresnel lens horizontally overlap each other.

3. The head-up display device of claim 1, further comprising a drive unit coupled to the housing and configured to control rotation of the housing.

4. The head-up display device of claim 3, wherein the drive unit comprises:
   a support unit coupled to the housing; and
   a driving motor unit configured to rectilinearly move the support unit.

5. The head-up display device of claim 1, further comprising a pivot device coupled to the housing and configured to function as a pivot axis of the housing.

6. The head-up display device of claim 5, wherein the pivot device comprises:
   a pivot connecting unit having a fixed first end and a second end having a ball shape; and
   a retainer coupled to the housing, wherein the second end of the pivot connecting unit is inserted to the retainer, and the retainer is configured to retain the inserted second end of the pivot connecting unit.

7. The head-up display device of claim 6, wherein:
the pivot device comprises first and second pivot devices,
the pivot connection unit comprises first and second pivot connection units corresponding to the first and second pivot devices, respectively, and
a pivot axis of each of the first and second pivot devices extends through the second end of a corresponding one of the first or second pivot connecting units.

8. A head-up display device configured to project an image on a windshield of a vehicle, comprising:
a housing;
a plurality of light sources housed at the housing and configured to emit light;
a display panel configured to display the image based on the light emitted from the plurality of light sources; and
an optical part disposed between the plurality of light sources and the display panel, the optical part comprising:
a first optical part configured to collect the light emitted from the light sources, the first optical part including a plurality of first optical structures respectively disposed corresponding to the plurality of light sources and protruding in a first direction toward the plurality of light sources; and
a second optical part configured to emit the light collected by the first optical part towards the display panel, the second optical part including a plurality of second optical structures respectively disposed corresponding to the plurality of first optical structures and spaced apart from each other, each second optical structure having a convex shape protruding in a second direction toward the display panel,
wherein the plurality of light sources are arranged in a plurality of rows, each row being at a mutually different distance from the windshield and supplied with a mutually different current set to compensate a deterioration in light uniformity of the image projected on the windshield due to the mutually different distance between each row and the windshield, the plurality of rows including first and second rows respectively being at first and second distances to the windshield, the second distance being greater than the first distance, and
wherein the plurality of light sources comprises:
a first light source arranged on the first row and supplied with a first current; and
a second light source arranged on the second row and supplied with a second current greater than the first current.

9. The head-up display device of claim 8, further comprising a drive unit coupled to housing and configured to control rotation of the housing.

10. The head-up display device of claim 9, wherein the drive unit comprises:
a support unit coupled to the housing; and
a driving motor unit configured to rectilinearly move the support unit.

11. The head-up display device of claim 8, further comprising a pivot device coupled to the housing and configured to function as a pivot axis of the housing.

12. The head-up display device of claim 11, wherein the pivot device comprises:
a pivot connecting unit having a fixed first end and a second end having a ball shape; and
a retainer coupled to the housing, wherein the second end of the pivot connecting unit is inserted to the retainer, and the retainer is configured to retain the inserted second end of the pivot connecting unit.

13. A head-up display device configured to project an image on a windshield of a vehicle, comprising:
a housing;
a plurality of light sources housed at the housing and configured to emit light;
a display panel configured to display the image based on the light emitted from the plurality of light sources;
an optical part disposed between the plurality of light sources and the display panel, the optical part comprising:
a first optical part configured to collect the light emitted from the light sources, the first optical part including a plurality of first optical structures respectively disposed corresponding to the plurality of light sources and protruding in a first direction toward the plurality of light sources; and
a second optical part configured to emit the light collected by the first optical part towards the display panel, the second optical part including a plurality of second optical structures respectively disposed corresponding to the plurality of first optical structures and spaced apart from each other, each second optical structure having a convex shape protruding in a second direction toward the display panel; and
a drive unit configured to control rotation of the housing and comprising a support unit coupled to the housing and a driving motor unit configured to rectilinearly move the support unit,
wherein the light sources are arranged in a plurality of rows including first and second rows, each row being at a mutually different distance from the windshield and supplied with a mutually different current set to compensate a deterioration in light uniformity of the image projected on the windshield due to the mutually different distance between each row and the windshield, the light sources including:
a plurality of first light sources arranged on the first row and being at a first distance to the windshield; and
a plurality of second light sources arranged on the second row and being at a second distance to the windshield greater than the first distance, and
wherein the first light sources are applied with a first current, and the second light sources are applied with a second current greater than the first current.

14. The head-up display device of claim 13, further comprising a pivot device coupled to the housing and configured to function as a pivot axis of the housing.

15. The head-up display device of claim 14, wherein the pivot device comprises:
a pivot connecting unit having a fixed first end and a second end having a ball shape; and
a retainer coupled to the housing, wherein the second end of the pivot connecting unit is inserted to the retainer, and the retainer is configured to retain the inserted second end of the pivot connecting unit.

16. A head-up display device comprising:
a plurality of light source configured to emit light and arranged in a plurality of rows including first and second rows;
a display panel configured to display an image based on the light emitted from the plurality of light source;
an optical part positioned between the plurality of light sources and the display panel and comprising:

a first optical part configured to collect the light emitted from the light sources, the first optical part including a plurality of first optical structures respectively disposed corresponding to the plurality of light sources and protruding in a first direction toward the plurality of light sources; and a second optical part configured to emit the light collected by the first optical part towards the display panel, the second optical part including a plurality of second optical structures respectively disposed corresponding to the plurality of first optical structures and spaced apart from each other, each second optical structure having a convex shape protruding in a second direction toward the display panel; and a Fresnel lens configured to magnify the image displayed at the display panel and project the magnified image on a windshield of a vehicle, wherein each row is at a mutually different distance from the windshield and is supplied with a mutually different current set to compensate a deterioration in light uniformity of the magnified image projected on the windshield due to the mutually different distance between each row and the windshield, wherein the plurality of light sources comprises:

a plurality of first light sources arranged on the first row and being at a first distance to the windshield; and a plurality of second light sources arranged on the second row and being at a second distance to the windshield, the second distance being greater than the first distance, and wherein the first light sources are applied with a first current, and the second light sources are applied with a second current greater than the first current.

17. The head-up display device of claim 16, wherein the first optical part comprises silicon.

* * * * *